United States Patent
Amin et al.

(10) Patent No.: US 7,926,878 B2
(45) Date of Patent: Apr. 19, 2011

(54) ROTATING ARMREST MECHANISM

(75) Inventors: Yogin Amin, Troy, MI (US); Sagar Kulkarni, Troy, MI (US); Richard Ensing, Greenville, MI (US); Scott Turpin, Troy, MI (US)

(73) Assignee: Magna Seating Inc., Aurora, Ontario (CA)

( * ) Notice: Subject to any disclaimer, the term of this patent is extended or adjusted under 35 U.S.C. 154(b) by 0 days.

(21) Appl. No.: 11/628,547

(22) PCT Filed: Jun. 6, 2005

(86) PCT No.: PCT/CA2005/000874
§ 371 (c)(1),
(2), (4) Date: Apr. 7, 2008

(87) PCT Pub. No.: WO2005/118334
PCT Pub. Date: Dec. 15, 2005

(65) Prior Publication Data
US 2008/0265647 A1 Oct. 30, 2008

Related U.S. Application Data

(60) Provisional application No. 60/577,157, filed on Jun. 4, 2004.

(51) Int. Cl.
*A47C 7/54* (2006.01)
*B60N 2/46* (2006.01)
(52) U.S. Cl. .............................. 297/411.32; 297/411.38
(58) Field of Classification Search .............. 297/411.3, 297/411.32, 411.38
See application file for complete search history.

(56) References Cited

U.S. PATENT DOCUMENTS

| | | | | |
|---|---|---|---|---|
| 2,661,227 A | * | 12/1953 | Murphy | 403/87 |
| 4,159,145 A | * | 6/1979 | Quakenbush | 297/113 |
| 5,290,092 A | | 3/1994 | Geer | |
| 5,342,115 A | * | 8/1994 | De Filippo | 297/411.32 |
| 6,217,119 B1 | * | 4/2001 | Cook et al. | 297/411.32 |
| 6,471,297 B1 | * | 10/2002 | Runde et al. | 297/411.32 |
| 6,883,871 B2 | * | 4/2005 | Nae et al. | 297/411.32 |
| 7,077,477 B1 | * | 7/2006 | Syrowik et al. | 297/411.32 |

(Continued)

FOREIGN PATENT DOCUMENTS

CA 2297695 4/2001

(Continued)

OTHER PUBLICATIONS

International Search Report and Written Opinion for PCT/CA05/000874 Dated Sep. 1, 2005.

(Continued)

*Primary Examiner* — David Dunn
*Assistant Examiner* — Philip Gabler
(74) *Attorney, Agent, or Firm* — Clark Hill PLC

(57) ABSTRACT

A seat assembly for a motor vehicle includes a seat back and an armrest rotatably coupled to the seat back for movement between a generally vertical, stowed position and a generally horizontal, use position. A guide member is disposed between the armrest and the seat back. The guide member includes a tube having an interior defining thread ridges. A guide pin extends through the tube and interconnects the armrest and seat back. The guide pin includes a helical screw thread portion for rotatably engaging the thread ridges to provide for lateral adjustment of the armrest towards and away from the seat back as the armrest moves between its respective stowed and use position.

5 Claims, 5 Drawing Sheets

U.S. PATENT DOCUMENTS

2002/0105217 A1 * 8/2002 Khedira et al. .......... 297/411.32
2004/0124687 A1 * 7/2004 Nae et al. ................. 297/411.32

FOREIGN PATENT DOCUMENTS

| CA | 2419141 | | 2/2002 |
|---|---|---|---|
| CA | 2441509 | | 3/2004 |
| JP | 60-131331 A | * | 7/1985 |
| JP | 5317139 A | | 12/1993 |
| JP | 2001197958 A | | 7/2001 |
| JP | 2003265266 A | | 9/2003 |

OTHER PUBLICATIONS

English Abstract of JP 5317139 A.
English Abstract of JP 2001197958 A.
English Abstract of JP 2003265266 A.

* cited by examiner

ROTATING ARMREST MECHANISM

CROSS REFERENCE TO RELATED APPLICATIONS

This is a National Stage application and claims priority to and all the benefits of International Application No. PCT/CA2005/000874, filed on Jun. 6, 2005, which claims priority to and all the benefits of U.S. Provisional Application No. 60/577,157, filed on Jun. 4, 2004 and entitled "Rotating Armrest Mechanism."

FIELD OF THE INVENTION

The invention relates to an armrest for a seat assembly of a motor vehicle. More particularly, the invention is related to an armrest that adjusts laterally as it is moved between use and stowed positions in order to accommodate a majority of seat occupants.

DESCRIPTION OF RELATED ART

A seat assembly for a motor vehicle will oftentimes include a pair of armrests coupled to a seat back. The armrests can be either fixedly secured to a seat back frame or movable relative thereto between a use position and a stowed position. In the use position, the armrest extends generally perpendicular to the seat back frame and forward therefrom for supporting a seat occupant's arm. In the stowed position, the armrest is generally parallel to the seat back frame to allow seat ingress and egress.

Typically, the lateral space between the armrests remains constant as the armrests move between the use and stowed positions. But while such a spatial relationship is acceptable to seat occupants when at least one of the armrests is in the stowed position, this same spatial relationship is a source of discomfort to many seat occupants when both of the armrests are in the use position. More specifically, when both armrests are in the use position, the armrests press inwardly against or constrict a majority of seat occupants. As a result, seat occupants are left with the choice of keeping both armrests in the use position, which provides dual arm support but decreases lateral seating space, or moving at least one of the armrests into the stowed position, which reduces available arm support but increases lateral seating space. Consequently, it is desirable to provide an armrest that adjusts laterally outwards as it moves from its stowed position to its use position in order to accommodate a majority of seat occupants.

SUMMARY OF THE INVENTION

A seat assembly for a motor vehicle includes a seat back and an armrest rotatably coupled to the seat back for movement between a generally vertical, stowed position and a generally horizontal, use position. A guide member is disposed between the armrest and the seat back. The guide member includes a tube defining an interior having thread ridges formed therealong. A guide pin extends through the tube, and interconnects the armrest and seat back. The guide pin includes a helical screw thread rotatably engaging the thread ridges to provide for lateral adjustment of the armrest towards and away from the seat back as the armrest moves between its respective stowed and use positions.

BRIEF DESCRIPTION OF THE DRAWINGS

Advantages of the present invention will be readily appreciated as the same becomes better understood by reference to the following detailed description when considered in connection with the accompanying drawings wherein.

DETAILED DESCRIPTION OF THE PREFERRED EMBODIMENT

Figure 1:
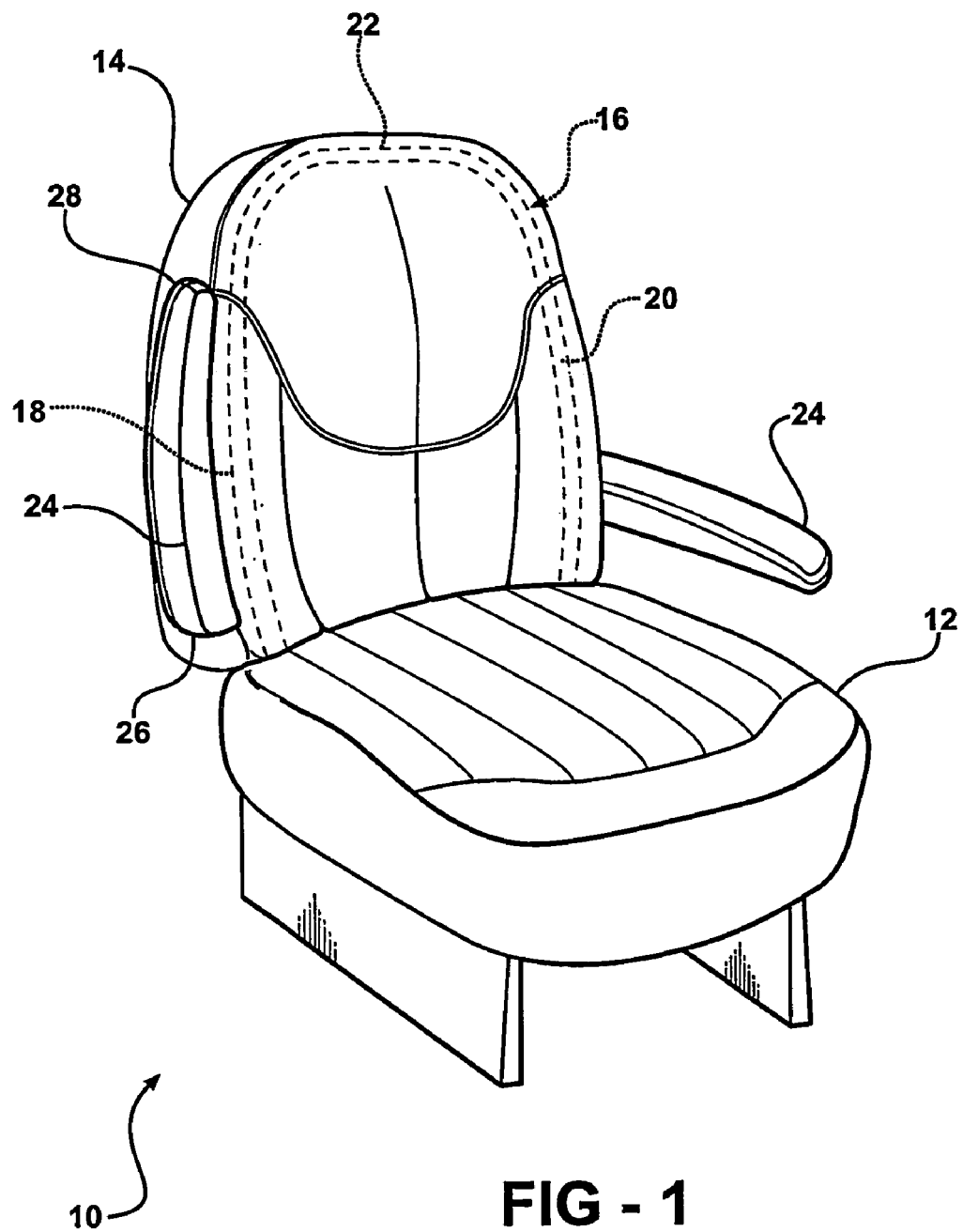
FIG. 1 is a perspective view of a seat assembly for a motor vehicle including a pair of armrests.

Referring to FIG. 1, a seat assembly, generally shown at 10, includes a seat cushion 12 and a seat back 14 coupled thereto. The seat back 14 includes a rigid seat back frame, generally indicated at 16, having a pair of opposing and laterally spaced apart side members 18, 20 and a cross member 22 extending between the side members 18, 20.

An armrest 24 is rotatably coupled to each side member 18, 20 of the seat back frame 16 for movement between a use position and a non-use or stowed position. In the use position, the armrest 24 is generally horizontal and extends out from one of the side members 18, 20 of the seat back frame 16. In the stowed position, the armrest 24 is generally vertical and extends upwardly along one of the side members 18, 20. In FIG. 1, the left armrest 24 is shown in the use position, and the right armrest 24 is shown in the stowed position. The left and right armrests 24 are symmetrical. Thus, only one of the armrests 24 will be described from this point forward with the understanding that the same applies equally to the other armrest 24.

Figure 2:
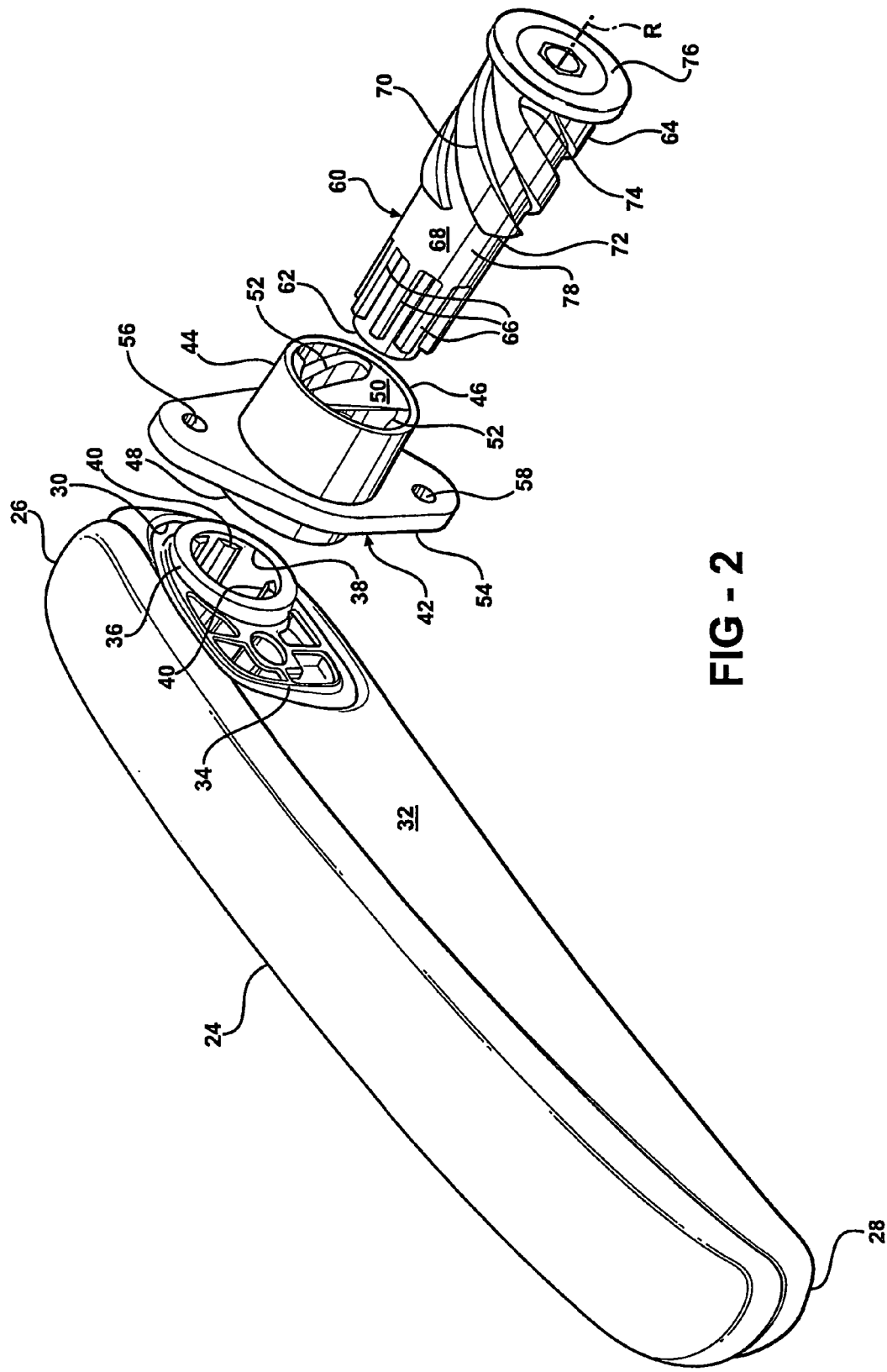
FIG. 2 is a exploded, perspective view of a adjustment member and pin utilized for coupling each armrest to a seat back frame.

Referring to FIG. 2, the armrest 24 extends between a pivot end 26 and an opposing distal end 28. A recess 30 is formed along an inboard surface 32 of the armrest 24 adjacent the pivot end 26 thereof. The recess 30 houses a coupling bracket 34. The coupling bracket 34 includes a cylindrical sleeve 36 defining an opening 38. A plurality of tooth engaging projections 40 is disposed along the inside of the cylindrical sleeve 36. It is, however, contemplated that the cylindrical sleeve 36 may be formed along the armrest 24 itself, thereby eliminating the need for the coupling bracket 34.

A guide member, generally indicated at 42, includes a tube 44 extending laterally between opposing inner 46 and outer 48 ends. The tube 44 includes an interior 50 having thread ridges 52 formed therealong. The thread ridges 52 extend along a substantial portion of the interior 50 between the inner 46 and outer 48 ends of the tube 44. The guide member 42 also includes a mounting plate 54 having apertures 56, 58. The mounting plate 54 extends around the tube 44, that is, the mounting plate 54 does not extend through the interior surface 50 of the tube 44.

A guide pin, generally indicated at 60, extends between opposing first 62 and second 64 ends. A plurality of splined teeth 66 is formed along an outer peripheral surface 68 of the guide pin 60 adjacent the first end 62 thereof. The plurality of splined teeth 66 engages the respective plurality of tooth engaging projections 40 at the pivot end 26 of the armrest 24 to fixedly secure the guide pin 60 to the armrest 24.

A helical screw thread 70 is formed along the outer peripheral surface 68 of the guide pin 60 adjacent the second end 64 thereof. The helical screw thread 70 extends between a first stop end 72 located at the approximate midpoint between the first 62 and second 64 ends of the guide pin 60, and a second stop end 74 at the second end 64 of the guide pin 60. The guide pin 60 extends through the tube 44 such that the helical screw thread 70 threadedly engages the thread ridges 52 along the interior surface 50 to allow rotational movement of the guide pin 60 relative to the guide member 42 about an axis R.

The guide pin 60 also includes a center portion 78 extending between the plurality of splined teeth 66 and the helical screw thread 70. The outer peripheral surface 68 of the guide pin 60 along the center portion 78 is a generally smooth surface. In other words, there is not a thread or teeth formed along the center portion 78 of the guide pin 60. A generally circular cap 76 is positioned at the second end 64 of the guide pin 60. The cap 76 has a diameter that is greater than that of the rest of the guide pin 60.

Figure 3:
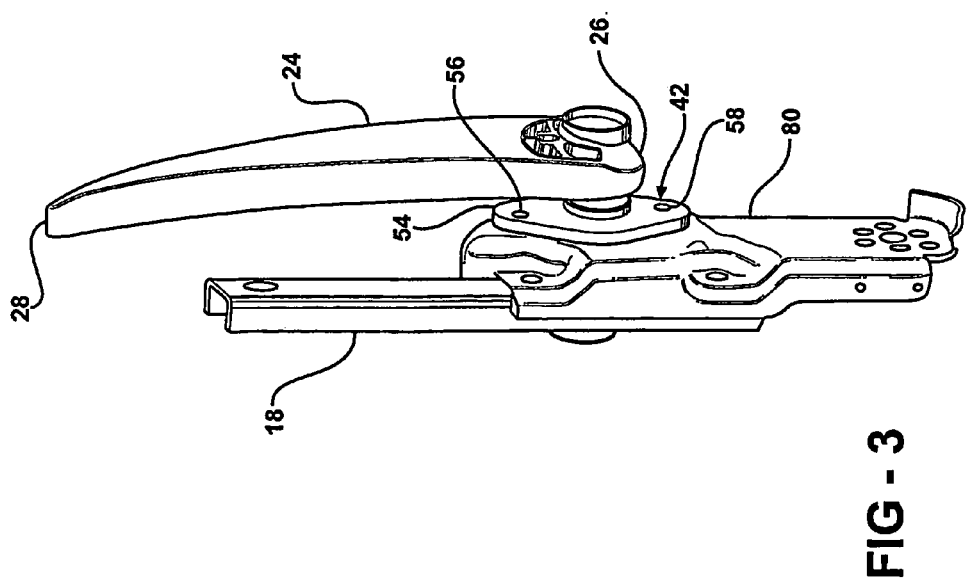
FIG. 3 is a rear perspective view of the armrest in a stowed position.

Referring to FIG. 3, a mounting bracket 80 is fixedly secured to the side member 18 of the seat back frame 16. Fasteners (not shown) extend through the apertures 56, 58 of the mounting plate 54 to fixedly couple the guide member 42 to the mounting bracket 80. As mentioned above, the guide pin 60 threadedly engages the guide member 42 for rotation about the axis R relative to the guide member 42. At the same time, the guide pin 60 moves laterally towards and away from the side member 18 due to the threaded engagement between the helical screw thread 70 and the thread ridges 52. The armrest 24, which is fixedly secured to the guide pin 60, thus rotates with the guide pin 60 about the axis R and simultaneously moves laterally towards and away from the side member 18.

Figure 4:
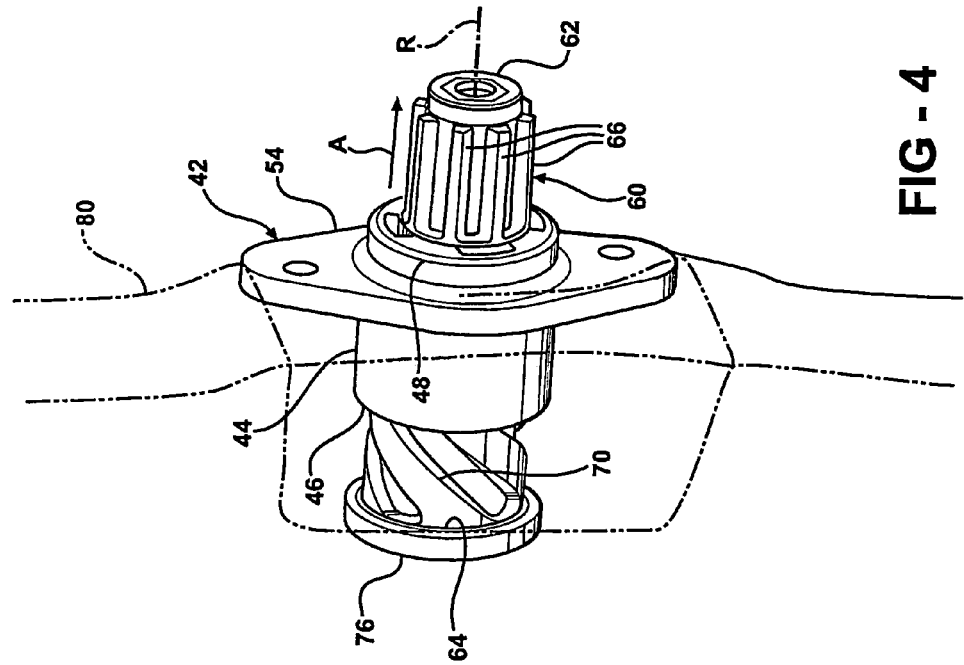
FIG. 4 is a perspective view of the pin threadedly engaging the adjustment member with the armrest in the stowed position.

The armrest 24 is shown in the stowed position in FIG. 3. When the armrest 24 is in the stowed position, the cap 76 of the guide pin 60 is spaced apart from the inner end 46 of the guide member 42, as shown in FIG. 4, and the center portion 78 of the guide pin 60 is disposed within the tube 44 of the guide member 42.

Figure 6:
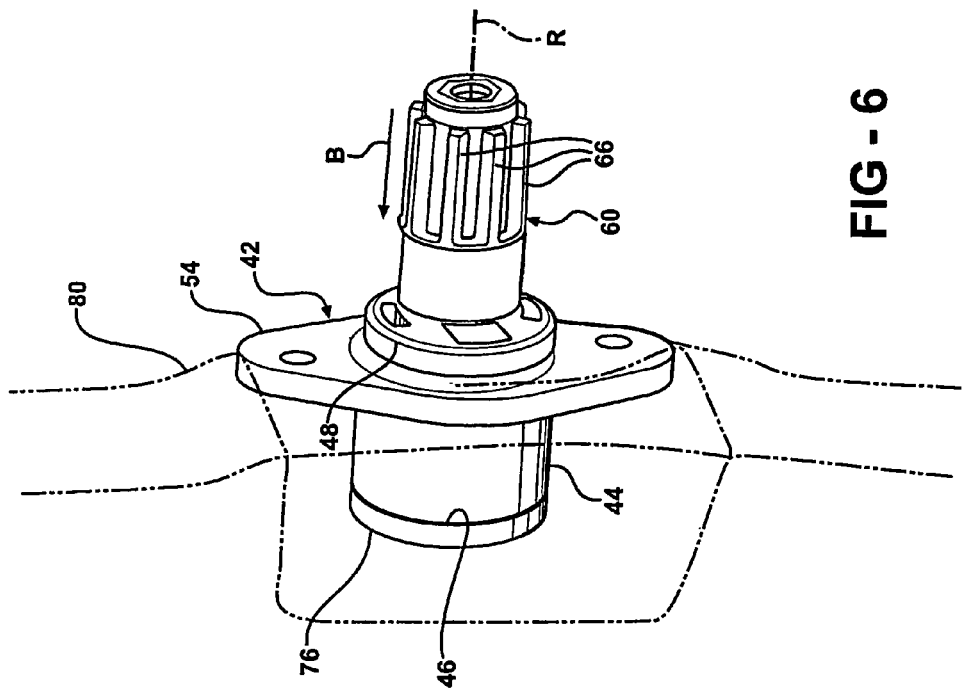
FIG. 6 is a perspective view of the pin threadedly engaging the adjustment member with the armrest in the use position.

When the armrest 24 is moved forwardly and downwardly from the stowed position to the use position, the armrest 24 urges the guide pin 60 into rotation about the axis R. More specifically, the helical screw thread 70 rotatably engages the thread ridges 52 of the guide member 42 until the cap 76 abuts the first end 46 of the guide member 42, as shown in FIG. 6. At the same time that the guide pin 60 rotates relative to the guide member 42, the guide pin 60 moves laterally outwards away from the side member 18 in the direction of arrow A, shown in FIG. 4. Such lateral movement of the guide pin 60 directs the armrest 24 to move laterally outwards away from the side member 18 and into its use position, shown in FIG. 5. Thus, when the armrest 24 is in its use position, it will have been adjusted laterally outwards relative to the side member 18.

Figure 7:
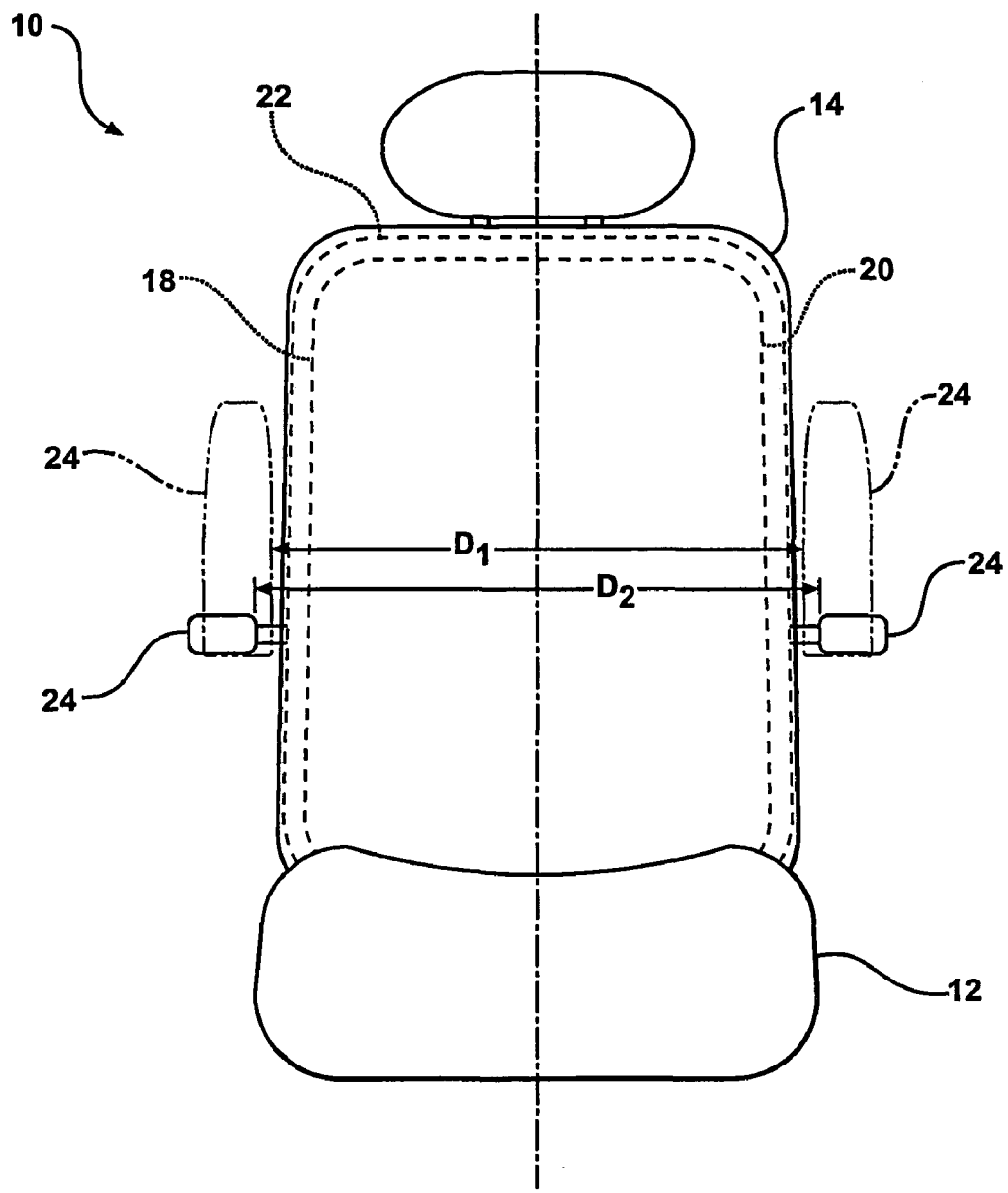
FIG. 7 is a front, elevational view of the seat assembly showing the armrests in the stowed and use positions.

The lateral adjustment that occurs as the armrests 24 moves between the use and stowed positions is shown in FIG. 7. When the armrests 24 are in the stowed position, as shown in dashed line, the distance between the armrests 24 is $D_1$. When the armrests 24 are subsequently moved into the use position, as shown in solid line, the armrests 24 adjust laterally outwards away from the side members 18, 20 such that the distance between the armrests 24 is increased to $D_2$. Thus, the lateral adjustment of the armrests 24 as they are moved from the stowed position to the use position results in increased lateral seating space along the seat assembly 10. As a result, the seat assembly 10 is able to accommodate a majority of seat occupants.

Figure 5:
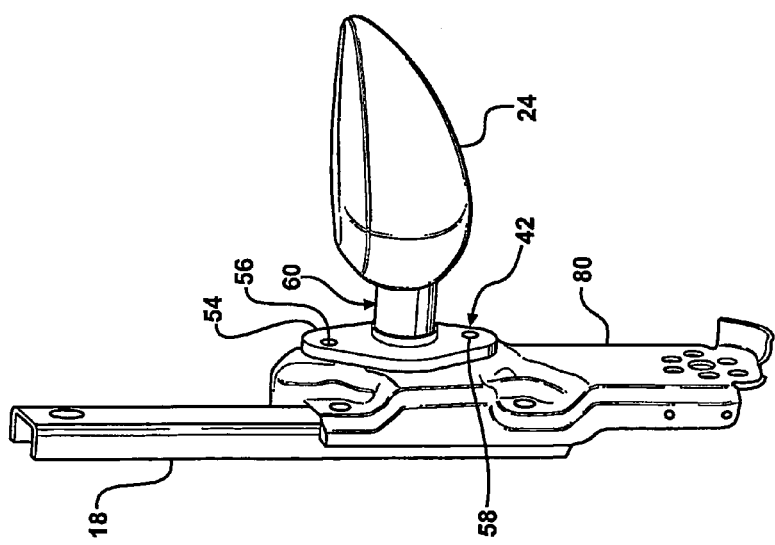
FIG. 5 is a rear perspective view of the armrest in a use position.

In operation, starting with the armrest 24 in the use position, as shown in FIG. 5, the armrest 24 is moved rearward and upward towards its stowed position. The upward movement of the armrest 24 urges the guide pin 60 to rotate in a counterclockwise direction (when viewed from FIG. 6) relative to the guide member 42 about the axis R. More specifically, the helical screw thread 70 threadedly engages the thread ridges 52 of the guide member 42 to provide for lateral movement of the guide pin 60 in the direction of arrow B. The armrest 24, which is fixedly secured to the guide pin 60, is thus urged towards the side member 18. As a result, the armrest 24 is adjusted laterally inwards in the direction of arrow B as it moves to the stowed position, shown in FIG. 3. Therefore, the initial rearward and upward rotational movement of the armrest 24 is translated into inward lateral movement of the guide pin 60 relative to the guide member 42, which reduces the distance between the armrests 24 from $D_2$ to $D_1$, as shown in FIG. 7.

To move the armrest 24 from the stowed position, shown in FIG. 3, back to the use position, the armrest 24 is urged forward and downward. The downward movement of the armrest 24 urges the guide pin 60 to rotate in a clockwise direction (when viewed from FIG. 4) relative to the guide member 42 about the axis R. More specifically, the helical screw thread 70 threadedly engages the thread ridges 52 of the guide member 42 to provide for lateral movement of the guide pin 60 in the direction of arrow A. The armrest 24, which is fixedly secured to the guide pin 60, is thus urged away from the side member 18. As a result, the armrest 24 is adjusted laterally outwards in the direction of arrow A as it moves to the use position, shown in FIG. 5. Therefore, the initial forward and downward rotational movement of the armrest 24 is translated into outward lateral movement of the guide pin 60 relative to the guide member 42, which increases the distance between the armrests 24 from $D_1$ to $D_2$, as shown in FIG. 7.

The invention has been described in an illustrative manner. It is to be understood that the terminology, which has been used, is intended to be in the nature of words of description rather than of limitation. Many modifications and variations of the invention are possible in light of the above teachings. Therefore, within the scope of the appended claims, the invention may be practiced other than as specifically described.

What is claimed is:

1. A seat assembly for a motor vehicle comprising:
   a seat back;
   an armrest rotatably coupled to said seat back for movement between a generally vertical, stowed position and a generally horizontal, use position, said armrest including a cylindrical sleeve having a plurality of spaced apart tooth engaging portions extending axially along said cylindrical sleeve;
   a guide member fixedly secured to said seat back and disposed between said armrest and seat back, said guide member including a cylindrical tube extending laterally between inner and outer ends and defining an interior having helical thread ridges formed therealong between said inner and outer end; and
   a guide pin extending axially through said tube between opposing first and second ends and interconnecting said armrest and seat back, said guide pin including a center portion defining an outer peripheral surface, a helical screw thread projecting from said outer peripheral surface and extending axially from said center portion to said second end, and a plurality of spaced apart splined teeth formed in said outer peripheral surface and extending axially along said guide pin from said center portion to said first end opposite said helical screw thread, said helical screw thread rotatably engaging said helical thread ridges to provide for lateral adjustment of said armrest towards and away from said seat back as said armrest rotates between its respective stowed and use positions, and said plurality of splined teeth arranged to matingly engage with said plurality of tooth engaging portions of said cylindrical sleeve fixedly securing said guide pin to said armrest for forcing said helical screw thread to rotate about said helical thread ridges as said armrest moves between said respective stowed and use positions.

2. A seat assembly as set forth in claim 1 wherein said guide member includes a mounting plate for coupling said guide member to said seat back.

3. A seat assembly as set forth in claim 2 wherein said helical screw thread extends between opposing first and second stop ends for defining the end of rotation of said guide pin relative to said tube.

4. A seat assembly as set forth in claim 3 wherein said guide pin includes a smooth center portion disposed between said helical screw thread and said plurality of splined teeth.

5. A seat assembly as set forth in claim 4 including a mounting bracket fixedly secured between said guide member and seat back for supporting said armrest along said seat back.

* * * * *